July 16, 1968 J. H. TRAUTMANN 3,392,813
CONTAINER HANDLING APPARATUS
Filed Nov. 16, 1966 2 Sheets-Sheet 1
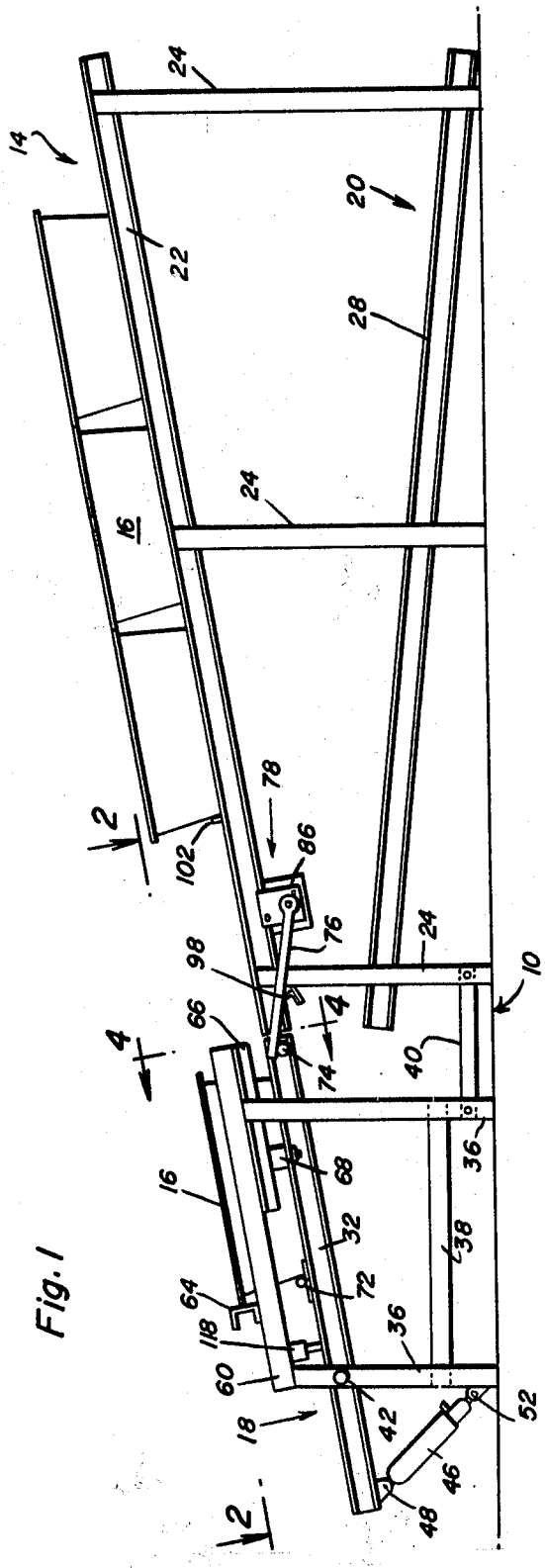
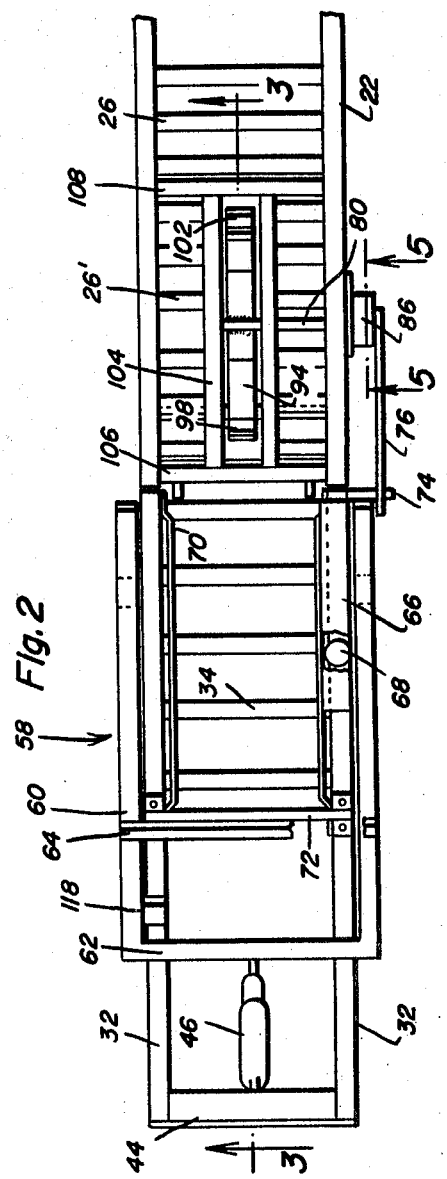
John H. Trautmann
INVENTOR.

July 16, 1968  J. H. TRAUTMANN  3,392,813
CONTAINER HANDLING APPARATUS
Filed Nov. 16, 1966  2 Sheets-Sheet 2

John H. Trautmann
INVENTOR.

BY Clarence A. O'Brien
and Harvey B. Jacobson
Attorneys

United States Patent Office 3,392,813
Patented July 16, 1968

3,392,813
CONTAINER HANDLING APPARATUS
John H. Trautmann, c/o Country Enterprises,
P.O. Box 163, Southbury, Conn. 06488
Filed Nov. 16, 1966, Ser. No. 594,773
2 Claims. (Cl. 193—36)

ABSTRACT OF THE DISCLOSURE

A gravity conveyor including a first, downwardly inclined track upon which tote pans travel. The track extends to a second, separate swingable track portion retained in an upward position by magnetic means. The swingable track portion retains each tote pan until same is loaded. The weight of a filled pan counteracts the attractive force of the magnetic means thereby causing the swingable track portion to swing downwardly to a position of alignment with a third, downwardly inclined track. Latching means on the first and second track portions insure the orderly loading and movement of one tote pan at a time through the conveyor.

---

The invention disclosed herein includes a conveyor assembly for containers such as tote pans and specifically includes a structure for positioning tote pans, one at a time, accurately for loading and to hold the tote pans in position while they are being loaded, to determine with a reasonable degree of accuracy when the tote pans have been filled to a desired total weight and then automatically remove the filled pan from the loading position and to replace the filled pan with an empty pan.

An object of the present invention is to provide a conveyor system for containers such as tote pans or the like which basically includes a storage area for one or more empty pans, a change-over area in which position the pans are actually loaded or filled one at a time and then automatically discharged into a storage area for the filled pan with the change-over area automatically reconditioning itself for receiving the next empty pan for filling.

The present invention has particular utility in manufacturing plants and the like where materials are being produced rapidly by a machine such as a stamping press, hot forging press or the like. In such situations, it is conventional practice to accumulate such materials in tote pans for subsequent handling. In order to replace a filled tote pan with an empty tote pan, a person usually known as a material handler must be available to remove the filled pans and to place empty pans in position to be filled. If the machine is producing rather bulky materials at a rapid rate, it may be necessary for the material handler to change tote pans at rather frequent intervals. While the time actually required to remove the filled pan and introduce an empty pan to the desired position may be relatively small, this operation does require that a worker be at that particular location with such frequency that the replacement of empty tote pans in place of filled tote pans is substantially a full time job for the person performing the task.

In addition to requiring a full time material handler, other problems are encountered such as the tote pan being only partially filled when removed and the material handler sometimes will drop a filled tote pan which may not only damage the tote pan but spill the material being handled onto a floor or the like thus rendering the entire operation rather inefficient.

Accordingly, the present invention provides an automatic mechanical device to position tote pans singly in a correct position for loading, to hold the tote pan in this position while they are being filled, to determined with a reasonable degree of accuracy when they have been filled to a desired total weight and then automatically to remove the filled pan from the loading position and to replace them with empty pans to be filled.

The filling or loading of the tote pans is accomplished in many different manners depending upon the requirements of individual users of tote pans. For example, materials may be discharged into the pans from a conveyor, a gravity chute, various production machines and the like. One of the essential features of the invention is the use of the force of gravity to activate the device for removing filled pans from the loading position, in placing the filled pans into the storage area therefore and introducing empty pans into a position for loading or filling thereby eliminating the necessity of providing power operated devices and enabling the structure to be retained non-complex in construction.

For determining the weight of the filled pans, a magnet is employed which operates in opposition to the force of gravity to retain the pans in their loading position until such time as the force of gravity overcomes the force of the magnet as the weight in the pan increases.

Another important and significant feature of the present invention resides in the particular arrangement of components and mechanical elements which in and of themselves are of relatively simple construction but optimum use is made of the space and area that is occupied by the device which is a significant consideration when considering the cost of floor space in manufacturing plants and the like. Further, the device is completely independent of any outside power source thereby reducing significantly the possibility of the device operating improperly or not operating at all. The structure being relatively simple is effective for its purposes and quite inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the container handling apparatus of the present invention illustrating several empty tote pans in stored position, and a tote pan in loading position;

FIGURE 2 is a plan view of a portion of the construction of FIGURE 1 taken generally along reference line 2—2 on FIGURE 1;

Figure 5:
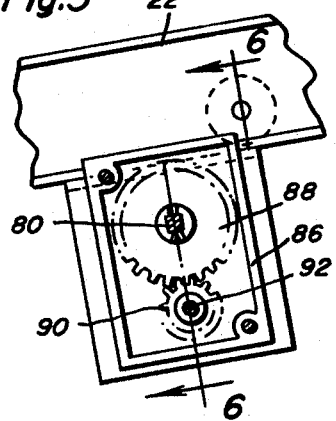
Figure 6:
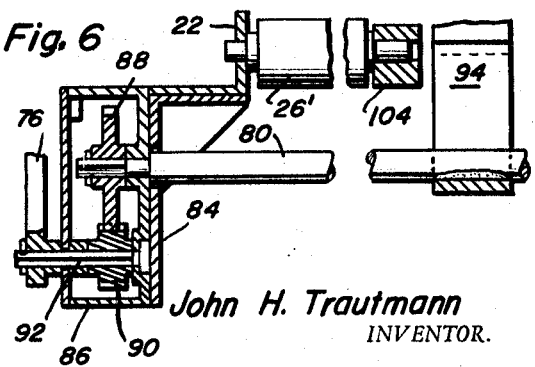

FIGURE 5 is a detailed sectional view taken substantially upon a plane passing along section line 5—5 of FIGURE 2 illustrating structural details of the mechanism for releasing one empty tote pan when the change-over conveyor section returns to its normal position; and FIGURE 6 is a detailed sectional view taken substantially upon a plane passing along section line 6—6 of FIGURE 5 illustrating further structural details of the empty tote pan retaining and releasing mechanism.

Referring now specifically to the drawings, the numeral 10 generally designates the container handling apparatus of the present invention which involves basically three components including a storage area 14 for empty tote pans 16, a loading and change-over section 18 and a storage area 20 for filled tote pans.

The tote pans 16 themselves are of conventional construction and may have a laterally projecting flange at the upper end thereof, oval-shaped handgrip openings in the end walls or of any conventional construction with the tote pans 16 generally being rectangular in configuration. The structure for filling the tote pans 16 when in the loading and change-over section 18 is not illustrated but it is understood that it may be any suitable type of conveyor, discharge chute or such a supply structure for material received in the tote pans may be manually or automatically operated and forms no particular part of the present invention.

Figure 4:
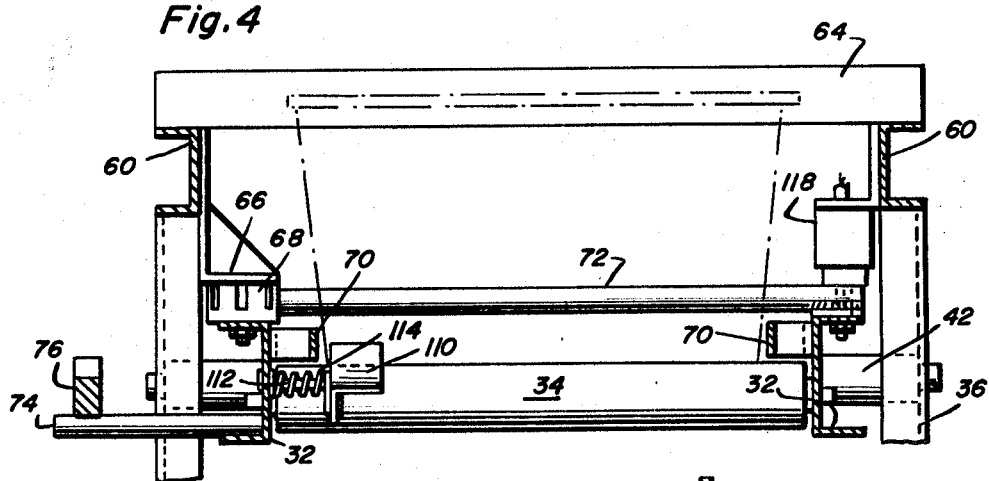
FIGURE 4 is a transverse, sectional view taken substantially upon a plane passing along section line 4—4 of FIGURE 1 illustrating further structural details of the change-over section of the conveyor.

The various sections of the handling apparatus basically are in the form of gravity conveyors. The storage section 14 for the empty tote pans 16 include a pair of parallel inclined side rails 22 which are supported above a suitable supporting surface by any suitable leg structure 24 or the like and suitable bracing may be employed and suitable connecting means may be provided between the legs 24 and the rails 22. For example, the rails 22 may be outwardly opening channel-shaped members as illustrated in FIGURE 4 and in FIGURE 6 but other standard structural shapes may be employed. Extending between the side rails and journalled in the vertical webs thereof is a plurality of freely rotating rollers 26 which rollingly support the tote pans 16 so that they will progress down the incline of the storage section 14 of the handling apparatus due to the force of gravity with it being understood that the rollers 26 are spaced apart a distance sufficient to enable the tote pans to be effectively supported during their movement down the inclined storage section.

The storage section 20 of the handling apparatus for the filled or loaded tote pans is of substantially the same construction as the storage area in that it includes side rails 28 supported from the legs 24 in a conventional manner with transversely extending freely rotating rollers 30 being journalled in the side rails 28 so that the loaded tote pans will move down the inclined storage section 20. As illustrated, the storage section 14 and the storage section 20 are in vertical alignment with each other and are oppositely inclined so that as observed in FIGURE 1, the tote pan 16 will proceed by gravity from right to left along the top storage section 14 and from left to right on the bottom storage section 20. A suitable stop device may be provided on the storage section 20 or the storage section 20 may be communicated with any suitable type of conveyor or other mechanism for removing the filled tote pans depending upon the requirements of the individual installation.

Figure 3:
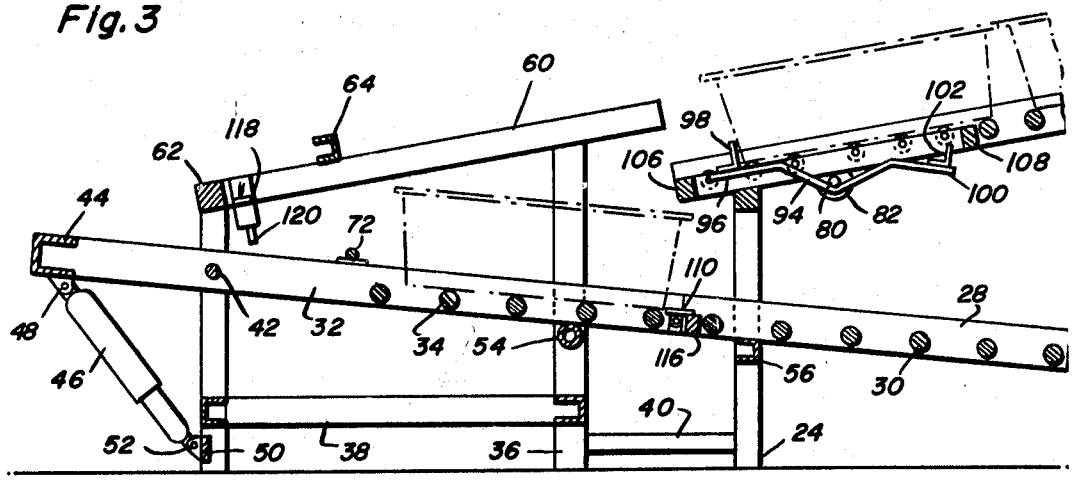
FIGURE 3 is a longitudinal sectional view taken substantially upon a plane passing along section line 3—3 of FIGURE 2 illustrating further structural details of the handling apparatus but with the change-over conveyor section lowered to position for discharge of a filled tote pan.

The change-over section 18 is also a conveyor structure which includes a pair of parallel side rails 32 which may also be channel-shaped members as illustrated in FIGURE 4 and the side rails 32 have freely rotatable rollers 34 extending therebetween as illustrated in FIGURES 2–4 in order to support the tote pan 16 as it is being filled. The side rails 32 are disposed between upstanding support legs 36 adjacent each end thereof with the legs 36 being rigidly interconnected by brace members 38 and the legs 36 adjacent the storage sections 14 and 20 are fixedly interconnected with the adjacent leg 24 by interconnecting members 40 for retaining the relationship of the change-over section 18 to the storage sections 14 and 20.

The side rails 32 are pivotally supported from the supporting legs 36 remote from the storage sections 14 and 20 by any suitable pivot pin, bolts or the like 42 which may be a shaft which extends between the pair of legs 36 or individual pivot pins or bolts. As illustrated in FIGURES 1–3, the side rails 32 extend outwardly beyond the legs 36 and are interconnected at their outer ends by a transverse frame member 44. The transverse member 44 is pivotally connected to a conventional telescopic shock absorber 46 by a pivot pin and lug assembly 48 and the lower end of the shock absorber 46 is connected to a transverse frame member 50 by a similar pivot pin and lug assembly 52 so that the pivotal swinging movement of the change-over section 18 about the pivot axis defined by the pivot pin 42 will be dampened or cushioned to enable it to move at a restricted rate of movement with this rate of movement being capable of being adjusted by providing an adjustment for the movement characteristics of the shock absorber which may be either pneumatic, hydraulic or the like. The transverse member 44 is in the form of a counterweight so that when the filled tote pan has been removed from the change-over area 18, it will be automatically returned to the position in alignment with the storage section 14 as illustrated in FIGURE 1. The lowered position of the storage section 18 is illustrated in FIGURE 3 and the side rails 32 are then aligned with the side rails 28 so that due to the force of gravity, the loaded or filled tote pan will roll off of the storage section 18 onto the storage section 20. For limiting the downward pivotal movement of the change-over section, a transverse member such as a pipe or rail 54 is provided between the legs 36. A similar transverse supporting member 56 may be provided between the legs 24 adjacent the legs 36 to provide a positive support for the side rails 28 of the storage section 20.

Interconnecting the upper ends of the legs 36 is a guide frame generally designated by numeral 58 and which includes a pair of side rails 60 interconnected by a cross rail 62 at the end thereof remote from storage section 14. A transverse stop member 64 is mounted on the side rail 60 and may be longitudinally adjustable thereon to form a stop for the tote pan. Also mounted on one of the side rails 60 is an enlongated ferrous member 66 which serves as an armature for a magnet 68 attached adjustably to the side rail 32 in underlying engagement with the armature 66 for serving as a means for releasably retaining the change-over section 18 in its elevated position with the magnetic attraction between the magnet 68 and the armature 66 being determined by the characteristics of the magnet 68 which is in the form of a conventional permanent magnet. While the force characteristics of the magnet are known, the weight required to be placed in the tote pan during filling thereof to cause release of the magnet may be varied by longitudinally adjusting the magnet 68 along the side rails 32 to vary the distance between the magnet 68 and the pivot pin 42. Thus, with this construction, the weight necessary to be added to the tote pan to cause automatic release of the change-over section 18 by overcoming the magnetic attraction between the magnet 68 and the armature 66. When the force of gravity overcomes the magnetic attraction, the change-over section 18 will swing down slowly due to the shock absorber 46 and the counterbalancing weight 44 which may be adjusted by adjusting position or by adding or by removing weight will return the change-over section to its elevated position with the shock absorber 46 also cushioning the return movement of the change-over section 18.

Also mounted on the inner surface of the side members 32 is a pair of guide members 70 which are slightly offset inwardly from the side rails 32 to guide the tote pan 16 as it enters the change-over section and as it leaves the change-over section. An additional transverse member in the form of a rod or the like 72 extends between the rails 32 and also forms a stop for the tote pan and may be longitudinally adjustable on the side rails. This will enable the tote pan to be retained in position even though the top edge thereof may be disposed below the transverse member 64 and also enables the transverse member 64 to be omitted if desired, or if relatively shallow tote pans are being employed.

At the end of the side rails 32 adjacent the side rails 22 of the storage section 14, one of the side rails 32 is provided with a laterally extending actuating pin or rod 74 which engages and actuates a control arm 76 for an indexing mechanism generally designated by numeral 78 which controls the movement of the empty pans from the storage area 14 and onto the change-over area 18.

The indexing mechanism includes a transversely extending shaft 80 which has one end thereof journalled in a depending bracket 82 carried by a side rail 22 and the other end thereof extending through a similar depending bracket 84 and into the interior of a hollow casing 86. The end of the shaft 80 which extends into the hollow casing 86 is provided with a gear 88 rigidly secured thereto for rotation of the shaft 80 in response to rotation of the gear 88. In meshing engagement with the gear 88 is a gear 90 mounted on a shaft 92 which is journalled in the casing 86 and projects laterally outwardly therefrom with one end of the arm or rod 76 being secured thereto in a non-rotative manner. For example, the shaft 92 may be polygonal where it extends through the gear 90 and arm 76 or any other suitable means may be provided for fixedly securing the arm 76 to the shaft 92, the gear 90 to the shaft 92 and the gear 88 to the projecting end of the shaft 80 so that upon pivotal movement of the arm 76, the shaft 80 will be correspondingly rotated a predetermined angular increment.

Attached to the shaft 80 is a longitudinally elongated mounting strap 94 which has the central portion thereof downwardly offset as illustrated in FIGURE 3 and the end portions thereof generally extending longitudinally outwardly with the end portion 96 disposed adjacent the change-over section 18 having an upwardly extending lug 98 thereon and the opposite end portion 100 having an upwardly extending lug 102 thereon. The lugs 98 and 102 are of sufficient length to extend above the plane of the top edge of the rollers 26 to engage the lowermost tote pan 16 on the storage section 14 or the next adjacent tote pan 16. As illustrated in FIGURE 2, the member 94 is oriented centrally between the side rails and relatively short rollers 26' are provided in this area which extend between central rails 104 and the adjacent side rails 22. The central rails 104 are rigidly fixed to transverse members 106 and 108 with it being pointed out that the depending bracket 82 may be provided on the central rail 104 remote from the casing 86 or on the side rail 22 remote therefrom as desired.

The length of the arm 76 is such that when the roller pin 74 is lowered due to the load in the filled tote pan causing downward swinging movement of the change-over section 18, the arm 76 will follow in a downward swinging movement due to the force of gravity and the weight of the arm. This rotation of the arm will cause corresponding swinging movement of the retaining strap 94 which will cause the lug 102 which engages the lowermost tote pan 16 as illustrated in FIGURE 1 to lower and thus permit it to roll down the storage area into engagement with the lug 98 which has been elevated which is the position illustrated in FIGURE 3. Then, after the loaded tote pan has been removed from the change-over section 18, the change-over section 18 will return to the position of FIGURE 1 and the rolling pin 74 will engage the arm 76 pivoting it back to the position of FIGURE 1 which then lowers lug 98 and raises lug 102 to permit the lowest tote pan onto the change-over section 18 while retaining the next adjacent tote pan in position for a subsequent movement.

The change-over section 18 includes a retaining latch mechanism for the filled tote pan to prevent it from moving off of the change-over section 18 until the side rails 32 are aligned with the side rails 28 of the storage section 20, This latch mechanism is in the form of a pivotal latch member 110 that is pivotally supported from the side rail 32 by a suitable pivot pin, shaft, bolt or the like 112. The latch element 110 is movable from a position generally parallel to the side rail 32 in alignment with or slightly below the top surfaces of the rollers so that the tote pan can move thereover when in the retracted position and a latching position in which the end thereof facing the tote pan on the change-over section 18 is elevated above the surface of the rollers to engage the tote pan and prevent it from moving down the downwardly inclined change-over section 18 as it approaches alignment with the storage section 20. The latch 110 may be gravity operated or a relatively weak torsion spring 114 may be provided thereon for assuring that the latch element 110 will pivot to latch position.

For retracting the latch element 110 to its retracted position, a transverse member 116 is provided between the side rails 28 to engage the end of the latching element at the end thereof opposite from the end which engages the tote pan to pivot the latching element to a horizontal position. Of course, empty tote pans coming down the inclined storage section 14 onto the change-over section 18 when in the position of FIGURE 1 will pivot the latching element 110 to the horizontal position by overcoming the overbalanced condition of the latching element if a gravity type latching element is used or overcoming the spring tension if a spring 112 is used.

If the material being discharged into the tote pan is conveyed thereto by a conveyor, chute or the like, an automatically operated arrangement may be provided for stopping the flow of such material. This structure may involve a switch device 118 mounted stationarily on the frame 58 so that an actuating plunger 120 or the like may be engaged by the side rail 32 of the change-over section 18 when in its operative position with a tote pan in position for loading so that the material will be discharged into the tote pan. Then, as the tote pan is filled and the weight thereof overcomes the magnetic attraction of he magnet 68 and the change-over section 18 swings downwardly about the pivot pins 42, the switch 118 will be actuated to stop discharge of material into the tote pans. This structure will vary depending upon the requirement of each individual installation.

Various of the components may be adjustable and the supporting structures may be varied depending upon the individual requirements of each installation. For example, the stops or lugs on the indexing mechanism may be adjustable to enable compensation for use with various sizes of tote pans. In addition, the roller pin on the change-over section 18 which engages the arm 76 may be arranged so that it is positively connected to the arm 76 or arranged so that it will positively move the arm down in one direction of movement and positively move it up in the other direction of movement for alternately raising and lowering the stops or lugs on the indexing mechanism. Also, if desired, the lower conveyor section or storage section 20 may be provided with a braking device to retard the motion of the filled pans as they advance into storage. Also, depending on whether or not the filled pans are to travel directly from the lower storage section 20 onto still another storage or transporting device, there may or may not be a fixed or movable stop at the lower end of the filled pan storage section 20.

The shock absorber 46 is of conventional construction and is of a double-acting variety in order that it may serve to cushion the impact of the pivoted conveyor as it is raised to its upper position as well as cushioning and controlling the fall of the pivoted conveyor along with the filled tote pan thereon. The shock absorber is adjustable in order that the total time of the change-over cycle may be kept at a minimum when handling lightly loaded pans while the fall of the heaviest burdens will still be properly cushioned.

The use of a permanent magnet is effective to hold the pans at proper elevation while they are being filled and its longitudinal adjustability will enable it to release at various predetermined gross weights. The gross weight at which the magnet releases is dependent upon its adjustability along the length of the armature which alters the moment arm of the supporting arrangement and thereby increases or decreases the ability of the magnet to support weight. While a permanent magnet is quite simple in some installations, it may be desirable to employ an electromagnet rather than a permanent magnet and it may be positioned in various orientations and the adjustment of the supporting ability of the magnet might be accomplished in any number of ways such as a variation in the number of magnets being used or in the size of the magnet or by varying the size of the contact area between the magnet and the armature or if an electromagnet is used, by varying the amount of current to the electromagnet.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A container handling apparatus comprising a roller conveying assembly comprising an upper storage section and a lower storage section oriented in vertical alignment, and a swingable change-over section being selectively aligned with the upper storage section and the lower storage section with the hinge axis of the change-over section being substantially coincident with the point of intersection of the planes of the upper and lower storage section, the upper storage section being inclined downwardly and towards the change-over section and the lower storage section being inclined downwardly and away from the change-over section thereby enabling a container to gravitationally proceed from the upper storage section onto the change-over section when aligned therewith with subsequent pivotal movement of the change-over section aligning the change-over section with the lower storage section for gravitational movement of the container onto the lower storage section, means retaining the change-over section in alignment with the upper storage section and releasable in response to a predetermined additive weight being placed on the change-over section to permit pivotal movement of the change-over section into alignment with the lower storage section, and means operatively associated with the change-over section and upper storage section to permit containers to move from the upper storage section onto the change-over section one at a time when the change-over section is aligned with the upper storage section, said means retaining the change-over section in alignment with the upper storage section and permitting release thereof including a magnet element and an armature element, with one of the elements being mounted on the change-over section and the other of the elements being stationarily supported for contact with the first mentioned of the elements for retaining the change-over section in alignment with the upper storage section, said change-over section extending beyond the pivot axis and provided with a counterbalancing weight on the free end thereof, the end of the change-over section adjacent the storage sections including a stop member thereon to limit the movement of containers onto the change-over section, said counterbalancing weight serving to return the change-over section to its position in alignment with the upper storage section when a filled container has been gravitationally moved from the change-over section to the lower storage section, said change-over section including an adjustable cushioning means to cushion and control the swinging movement of the change-over section in both directions of movement, said change-over section including a latch means theron for retaining a container thereon when being lowered, said latch means being rendered inoperative when the change-over section becomes aligned with the lower storage section, said means for enabling movement of the containers one at a time including a pair of longitudinally spaced stop members selectively elevatable into the path of movement of the containers, and means operative in response to swinging movement of the change-over section to alternately raise and lower the stop members to singly release the containers stored on the upper storage section.

2. The container-handling apparatus set forth in claim 1 wherein one of said elements is adjustably mounted in relation to the pivot axis of the change-over section to vary the moment arm of the magnetic attraction between the magnet element and armature element for varying the force required to cause release of the change-over section.

References Cited

UNITED STATES PATENTS

| | | | |
|---|---|---|---|
| 1,556,438 | 10/1925 | Hanson et al. | |
| 2,980,222 | 4/1961 | Crosby | 198—35 |
| 3,057,448 | 10/1962 | Kornylak | 198—36 |
| 3,163,025 | 12/1964 | Dahlgren. | |

FOREIGN PATENTS

| | | |
|---|---|---|
| 232,503 | 4/1925 | Great Britain. |

EVON C. BLUNK, *Primary Examiner.*

RICHARD E. AEGERTER, *Examiner.*

M. L. AJEMAN, *Assistant Examiner.*